June 13, 1961  O. H. SCHELDORF  2,988,405
SELF-ALIGNING BEARING CONSTRUCTION
Filed May 16, 1960
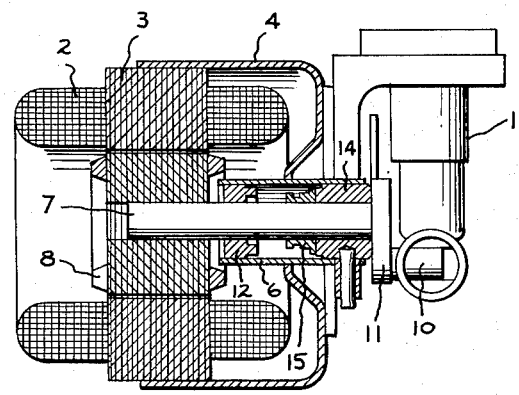
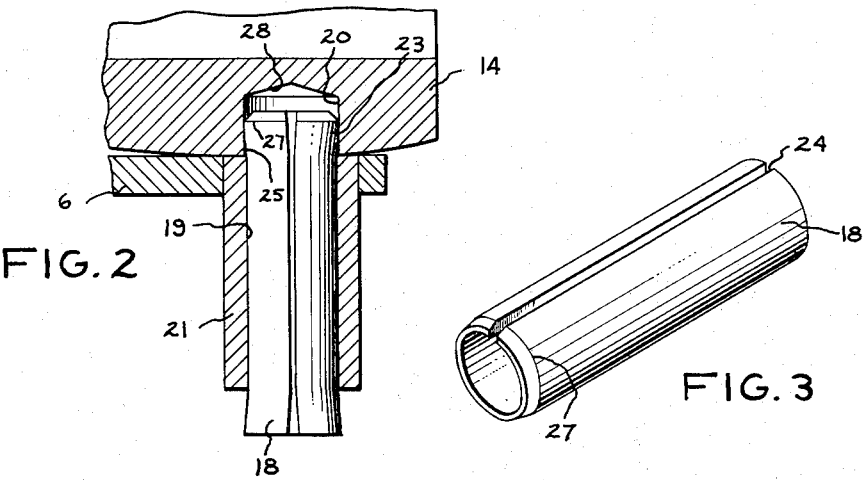
INVENTOR.
OWEN H. SCHELDORF
BY *Walter E. Rule*
HIS ATTORNEY 2,988,405
SELF-ALIGNING BEARING CONSTRUCTION
Owen H. Scheldorf, Fern Creek, Ky., assignor to General Electric Company, a corporation of New York
Filed May 16, 1960, Ser. No. 29,214
2 Claims. (Cl. 308—72)

The present invention relates to bearings and is more particularly concerned with a self-aligning bearing including an improved locking or anchoring pin designed to prevent axial movement of the bearing within a supporting sleeve while permitting sufficient radial and tilting movement of the bearing to provide the desired self-alignment thereof with a shaft.

In many applications of self-aligning bearings, it is desirable to limit or completely prevent any axial movement of the self-aligning bearing in its supporting sleeve but to allow sufficient rocking movement and radial movement of the bearing so that the bearing will align itself with a shaft. One such application is in small motor compressor units such as those used in the refrigeration industry in which the drive motor and the compressor are both mounted on a horizontally extending drive shaft supported by two spaced bearings, one of which is self-aligning. In the operation of such units there are significant axial forces resulting from the fact that the geometric and magnetic "centers" of an electric motor are not the same. When the self-aligning bearing is employed as a thrust bearing to take care of the axial forces, it becomes desirable to provide means for limiting or preventing axial movement of the bearing relative to its supporting sleeve.

It has been common practice to limit movement of a self-aligning bearing within a supporting sleeve by means of a set screw or a solid or rigid pin extending through the sleeve and into a suitable recess provided in the bearing. A set screw usually requires a locking nut or other anchoring means to prevent the screw from becoming loosened during operation of the apparatus. Where a solid inflexible pin has been employed, the clearance between the pin and the walls of the pin receiving recess in the bearing which is necessary to provide the self-aligning radial or tilting movement of the bearing also permitted axial movement thereof.

An improved anchoring of the self-aligning bearing within a supporting sleeve is accomplished in accordance with the present invention by employing a locking pin in the form of a split cylinder composed of a resilient material such as spring steel and designed to engage the walls of the bearing recess in such a manner as to prevent axial movement of the bearing while permitting rocking and radial movement thereof. To this end, the bearing sleeve is provided with a radially extending opening while the bearing is provided with a cooperating recess of a diameter slightly larger than the diameter of the sleeve opening. A locking pin in the form of a split resilient cylinder, preferably composed of spring steel, having a normal or uncompressed diameter slightly greater than the bearing recess is press fit through the sleeve opening and into the bearing recess. During the press fitting operation the split cylindrical member is deformed or compressed to the diameter of the sleeve opening. However, as the forward end thereof emerges from the sleeve opening into the bearing recess of slightly larger diameter, it flares out into engagement with the walls of the recess to contact those walls along an annular line. Due to this line contact, the bearing is capable of rocking movement about this line of contact as well as radial movement relative to the pin. However due to the firm engagement of the pin end with the bearing recess, axial movement of the bearing is prevented.

For a better understanding of the invention, reference may be had to the accompanying drawing in which:

FIG. 1 is a side elevational view of a motor compressor unit partially broken away to illustrate the present invention;

FIG. 2 is an enlarged fragmentary detailed view of the invention; and

FIG. 3 is a perspective view of the locking pin employed in the practice of the present invention.

Referring to the drawing, there is shown in FIG. 1 a motor compressor unit including an eccentric type compressor 1 and a drive motor 2. The stator component 3 of the drive motor and the compressor 1 are supported on a cup-like frame 4 which includes an axially extending bearing sleeve integral therewith through which the shaft 7 connecting the motor rotor 8 with the compressor extends. The compressor is operatively connected to the shaft 7 by means of a crank pin 10 eccentrically disposed on a shoulder 11 formed concentrically on the compressor end of the shaft 7.

In the illustrated compressor, two spaced bearings are provided within the sleeve 6 for supporting the shaft 7. One of these bearings indicated by the numeral 12 is at the motor end of the bearing sleeve 6. The other bearing 14 at the compressor end of the sleeve 6 is a self-aligning bearing which is also employed to limit the axial movement of the shaft within the sleeve, such movement between the shaft and the bearing being limited by the shoulder 11 on one side of the bearing 14 and by a collar 15 press fit on the shaft 7 on the other side of the bearing 14.

In accordance with the usual self-aligning bearing practice, the outer surface of the bearing 14 is arcuate or slightly curved in axial or longitudinal cross section as indicated in FIG. 2 of the drawing. This permits limited rocking movement of the bearing within the sleeve 6 in order that the bearing 14 can tilt within the sleeve 6 to bring its axis into parallel alignment with the axis of the shaft as supported by the fixed bearing 12.

To prevent axial movement of the bearing 14 within the sleeve 6 and thereby limit axial movement of the shaft and the elements supported thereon by the unbalanced forces resulting from the fact that the geometric and magnetic "centers" of the motor compressor unit are not the same, there is provided in accordance with the present invention an improved locking pin arrangement comprising a split cylindrical pin or member 18 extending through an opening 19 in the sleeve 6 and into a cylindrical recess 20 in the bearing 14. The split cylinder locking pin has a larger diameter than opening 19 while recess 20 has an intermediate diameter. In order that the opening 19 in the bearing sleeve will have sufficient length to rigidly anchor and support the locking pin 18, in the illustrated embodiment of the invention the opening 19 is defined by a tubular member 21 extending radially through and brazed or welded to sleeve 6. It will be obvious of course that if the sleeve walls are of sufficient thickness, the tubular member 21 may not be required.

As the hollow locking pin 18 is composed of a resilient material such as spring steel, it is compressed or deformed to a smaller diameter than normal as it is pressed through the opening 19 in the sleeve 6 and can thereafter expand slightly as the forward end 23 thereof enters the recess 20. As the cylindrical member 18 has a normal or uncompressed exterior diameter which is slightly larger than the diameter of the opening 19, the longitudinal slot 24 in the split cylindrical member 18 is of the width sufficient that when this member is press fit into the opening 19, the slot 24 permits the cylindrical member to be compressed to the smaller diameter of the opening 19 so that it will pass therethrough. As the upper end 23 of the member 18 emerges from the opening 19 and passes into the recess 20 which is in alignment with opening 19, the resiliency of the member 18 will cause this end to flare out or expand into engagement with the cylindrical wall 25 of the recess 20. As a result there is obtained an annular or circumferential line contact of the end 23 of the pin 18 with the cylindrical wall 25 of the recess 20. In the illustrated embodiment of the invention in which the end 23 is beveled to facilitate insertion of the pin 18 in the opening 19 this line of contact involves the lower peripheral edge 27 of the beveled end portion.

Since the contact between the member 18 and the recess wall 25 is substantially limited to a line extending circumferentially around the end of the member 18, there is very little resistance to rocking alignment movement of the bearing 14 since the bearing is relatively free to pivot about this line contact point. To limit the contact between the member 18 and the wall 25 to a circumferential line, the member 18 should be driven into the recess 20 only a distance sufficient to permit the end or edge 23 thereof to come into contact with the recess wall 25. This distance, of course, will depend upon the relative diameters of the opening 19 and the recess 20 and the resilient characteristics of the cylindrical member 18 which control the flaring of the end thereof. In addition, the member 18 should not engage the bottom wall 28 of the recess 20 since such additional contact will increase the rigidity of the joint between the member 18 and the bearing 14 and decrease the aligning movement of the bearing 14.

To obtain this desired contact of the member 18 with the bearing in order to limit axial movement thereof while permitting rocking movement, the diameter of the recess 20 should not exceed the diameter of the opening 19 by an amount greater than the possible expansion or flaring of the end 23 of the member 18 within the recess 20. As an example of the relative dimensions required, the advantages of the present invention have been obtained by employing a locking pin in the form of a split cylinder of spring steel having an original outside diameter of about 0.0250 inch. With the locking pin of this diameter, the opening 19 was provided with a diameter of about .0240 inch while the recess 20 in the bushing had a diameter of about 0.241 inch. While greater differences between the diameters of the opening 19 and the recess 20 can be employed, this difference is determined by the depth of the recess 20 and the resilient characteristics of the cylindrical member 18 since the end 23 of the cylindrical member must flare into engagement with the recess wall 25 before the member 18 contacts the bottom wall 28 of that recess.

It has also been found that the present invention permits some radial motion of the bearing 14 relative to the sleeve 6 to reposition the bearing within the sleeve. This permits radial motion, if needed, to position the bearing in the sleeve following assembly thereof. During the assembly, the frictional engagement of the cylindrical member 18 with the recess wall 25 will cause the bearing to move to the opposite side of the sleeve so that any clearance between the bearing and the sleeve will be taken up opposite the locking pin. Since the locking pin is preferably positioned on the loaded or bottom side of the bearing, the subsequent normal loading of the bearing will cause the bearing to slip downwardly over the pin whereby the bearing clearance will be concentrated on the upper side of the bearing, or in other words the bearing will be supported on the bottom portion thereof in contact with the sleeve 6.

While there has been shown and described a specific embodiment of the present invention, it is not desired that the invention be limited to the particular form shown and described and it is intended by the appended claims to cover all modifications within the spirit and scope of the invention.

What I claim as new and desire to secure by Letters Patent of the United States is:

1. A self-aligning bearing construction comprising a bearing sleeve having a cylindrical opening in the wall thereof, a bearing positioned in said sleeve, said bearing having an annular recess in the outer surface thereof coaxial and communicating with said opening and having a diameter greater than said opening, and means for positioning said bearing in said sleeve for limited self-aligning movement thereof comprising a longitudinally split cylindrical member composed of spring metal and having a normal diameter greater than the diameter of said recess, said member being press fit through said opening with the forward end thereof extending into said recess, resilient expansion of said forward end of said member causing said end to engage the side wall of said recess along a line extending circumferentially of said member to prevent axial movement of said bearing while permitting self-aligning movement of said bearing.

2. A self-aligning bearing construction comprising a bearing sleeve having a radially extending cylindrical opening therein, a bearing positioned loosely in said sleeve, said bearing having an annular recess in the outer surface thereof communicating with said opening and having a diameter slightly greater than said opening, and means for positioning said bearing in said sleeve for limited self-aligning movement thereof comprising a longitudinally split cylindrical member composed of spring steel and having a normal diameter greater than the diameter of said recess press fit through said opening with the forward end thereof extending into said recess, resilient expansion of said end of said member causing engagement of the periphery thereof with the cylindrical wall of said recess along a line extending circumferentially of said member to prevent axial movement of said bearing while permitting self-aligning movement of said bearing.

References Cited in the file of this patent

UNITED STATES PATENTS

| | | |
|---|---|---|
| 2,397,164 | Shafer | Mar. 26, 1946 |
| 2,441,294 | Shafer | May 11, 1948 |
| 2,827,340 | Johnson | Mar. 18, 1958 |